US011998500B1

(12) United States Patent
Zhang

(10) Patent No.: US 11,998,500 B1
(45) Date of Patent: Jun. 4, 2024

(54) MASSAGE DEVICE

(71) Applicant: Wenbin Zhang, Dongguan (CN)

(72) Inventor: Wenbin Zhang, Dongguan (CN)

( * ) Notice: Subject to any disclaimer, the term of this patent is extended or adjusted under 35 U.S.C. 154(b) by 0 days.

(21) Appl. No.: 18/089,162

(22) Filed: Dec. 27, 2022

(51) Int. Cl.
*A61H 15/00* (2006.01)
*A61H 7/00* (2006.01)

(52) U.S. Cl.
CPC .......... *A61H 15/0078* (2013.01); *A61H 7/00* (2013.01); *A61H 2201/01* (2013.01); *A61H 2201/1207* (2013.01); *A61H 2201/1418* (2013.01)

(58) Field of Classification Search
CPC .. A61H 2201/01; A61H 2201/12–1246; A61H 2201/1418; A61H 2201/1463; A61H 2201/149; A61H 2201/1669; A61H 19/00; A61H 19/32; A61H 23/00; A61H 23/02; A61H 7/00; A61H 7/004; A61H 7/005; A61H 7/007
See application file for complete search history.

(56) References Cited

U.S. PATENT DOCUMENTS 9,987,190 B2 6/2018 Stout
11,491,078 B1 * 11/2022 He .......................... A61H 7/005
11,554,073 B1 * 1/2023 Guo ........................ A61H 7/005
11,633,327 B1 * 4/2023 Wu .................... A61H 23/0263 601/70
2010/0036298 A1 * 2/2010 Fuster .................... A61H 7/008 601/134
2020/0046598 A1 * 2/2020 Shen ........................ A61H 1/00
2022/0096320 A1 * 3/2022 Lu ........................ A61H 23/006

* cited by examiner

*Primary Examiner* — Colin W Stuart
*Assistant Examiner* — Matthew R Moon
(74) *Attorney, Agent, or Firm* — Che-Yang Chen; Law Office of Michael Chen

(57) ABSTRACT

The invention provides a massage device, which comprises the shell and two symmetrical elastic massage parts, wherein the driving part and the guiding transmission part connected with the driving part are arranged in the shell. The guiding transmission part drives the two elastic massage parts to move towards or away from each other. The massage device of the invention is convenient to use, which could relieve the pressure and fatigue of people and makes them relaxed by massaging the body.

9 Claims, 4 Drawing Sheets

MASSAGE DEVICE

FIELD OF THE INVENTION

The invention relates to the field of health care massage products, in particular to a massage device.

BACKGROUND OF THE INVENTION

As people's awareness of health care is gradually strengthened, aging is accelerating and sub-health problems are prevalent, the demand of massage appliance industry is increasingly strong. Common massagers on the market can be divided into physical extrusion massagers, pulse massagers, airbag massagers, electromagnetic massagers, vibration massagers, etc. The physical extrusion massagers mainly drive the massage head to realize the massage effect of muscles by the motor, the pulse massagers could stimulate the activation of deep muscle contraction by means of electrical stimulation, so that the massage effect could be achieved by recovering the elasticity of tight muscles. The air bag massagers could press acupoints by pneumatic force to achieve massage effect. The electromagnetic massager and vibration massager mainly complete the massage process by adding magnets and vibration functions.

However, with the aging of the global population structure, the increasing number of sub-health people caused by irregular work and rest, and people's higher and higher requirements for their own health and quality of life, the requirements for the functionality and diversity of massage appliances are also becoming higher and higher. Therefore, it is necessary to develop a massage device which is convenient to use, simple in structure, with the function of relieving pressure and releasing stress.

SUMMARY OF THE INVENTION

In order to overcome the above technical problems, the invention provides a massage device which is convenient to use, simple in structure, and could relieve fatigue and release stress.

In order to achieve the above object, this invention provides a massage device, which comprises the shell and two symmetrical elastic massage parts. The driving part and the guiding transmission part are provided within the shell, the guiding transmission part is connected with the driving part, and the guiding transmission part could drive the two elastic massage parts to move towards or away from each other.

Further, the aforementioned guiding transmission part comprises the guiding part, two fixed rods and two swing parts; the aforementioned guiding part comprises two vertically arranged rotating parts driven by the driving part; Each of two rotating parts are provided with one column heads respectively, and the two column heads are symmetrically arranged along the central axes of two rotating parts; the aforementioned two fixing rods are positioned above the guiding part, symmetrically and in parallel with the rotation center of the guiding part, and both ends of the fixing rods are fixed on the inner wall of the shell; the aforementioned two swing parts are vertically arranged along the rotating part and rotatably connected to two fixed rods respectively; One end of two swing parts are provided with sliding groove respectively, the column head is arranged within the sliding groove and could slide along the sliding groove; The other end of two swing parts are provided with jointed arms, which could be connected with the elastic massage parts respectively. When the guiding parts rotate, the two swing parts could swing around the fixing rods in opposite directions or in reverse directions respectively, in order to drive the elastic massage parts to move oppositely or reversely.

Further, the aforementioned guiding part comprises the driving gear directly driven by the driving part, and the rotating part, that is the driven gears. The driving gear is meshed with two driven gears, in order to achieve the effect that the power and the transmission speed could be adjusted as required, the transmission ratio of the two gears could be adjusted according to the requirement of working speed, such as from high speed to low speed, from low speed to high speed, or the same specific speed.

Further, the aforementioned two swing parts could swing in the vertical direction of the fixing rods respectively.

Further, the aforementioned column head is similar to the cylinder with contractile top, and the shape of the inner cross section of the sliding groove is matched with the shape of the column head.

Further, the aforementioned jointed arms have vibration function with the vibration motor installed inside, then the vibration could be generated by the movement of the motor, which can further stimulate the body parts of users and achieve the purpose of muscle relaxation.

Further, the swing part, the sliding groove and jointed arm at both ends could be designed into integrated structure or split structure, which could be assembled together to complete the coordinated movement.

Further, the swing part comprises the horizontally arranged first connecting guiding sleeve, which is arranged at the approximate middle part of the swing part and connected with the fixing rod in a relatively rotating way; The connecting piece is connected with the sliding groove, which extends downward from the first connecting guide sleeve; The second connecting guide sleeve is connected with the jointed arm, which extends vertically upward from the first connecting guide sleeve.

Further, the shape of the aforementioned elastic massage part could be varied to meet the function of the massager, for example, the elastic massage part could be two fingers, or two sheets, or the shape suitable for matching with body parts.

Further, the upper end of the shell is open, and the guiding transmission part is connected with the two elastic massage parts through the opening of the shell. Further, the outer side of the aforementioned shell could be wrapped with a layer of elastic sleeve, the elastic sleeve and the elastic massage part could be connected together to form an integrated structure.

Further, the elastic sleeve and the elastic massage part could be elastic materials such as modified plastic, rubber, silica gel or EVA. Further, the aforementioned driving part could be a motor, and one end of the motor shaft could be connected with the guiding part, in order to drive the guiding part to rotate.

Further, the motor could be powered by the internal or external power supply, and the power supply could be a rechargeable battery, a disposable battery or a storage battery. In order to maintain the stability of the device, the battery can be arranged on the battery fixing seat inside the shell.

Further, the side wall of the shell is provided with the charging socket matched with the rechargeable battery, which can be connected with external power supply, in order to charge the rechargeable battery. Further, the aforementioned driving component includes the control board with control switch, which is connected with the power supply and the motor respectively. The control panel could be fixed on the inner wall of the shell, and the control switch is arranged to protrude out of the shell, which is convenient for users to control.

Further, the motor is positioned on the motor fixing seat on the inner wall of the shell. Further, the speed of the motor and the rotating speed of the rotating part could be adjusted, so that the swing frequency of the jointed arms could be adjusted, and different massage effects and personalized use requirements could be realized.

Compared with the prior art, the beneficial effects of the present invention are (i) the massage device of this invention utilizes the driving part to drive the guiding part, the column head on the guiding part is matched with the sliding groove at one end of two swing parts, and the other end of the two swing parts are provided with jointed arms, which are respectively connected with the elastic massage parts. When the two column heads are driven by the guiding part to rotate, the two jointed arms swing in opposite directions, driving the elastic massage parts to move towards or away from each other, then placing the elastic massage parts on the muscle tissue of body parts, so as to realize the massage effect of grasping, pulling, sucking and rubbing on muscles of human body parts; (ii) the massage device of this invention could massage body parts of the human body by imitating the grasping and squeezing action of hands, so as to achieve the relaxed massage effect or physiotherapy exercise effect on the muscle groups of human organs; and (iii) the massage device of the present invention is especially suitable for busy works or daily life when people feel tired, it could be used to relieve fatigue or release stress, massage and relax different muscle groups, and achieve the function of relaxing tendons and activating collaterals.

DETAILED DESCRIPTION OF THE PREFERRED EMBODIMENTS

Figure 1:
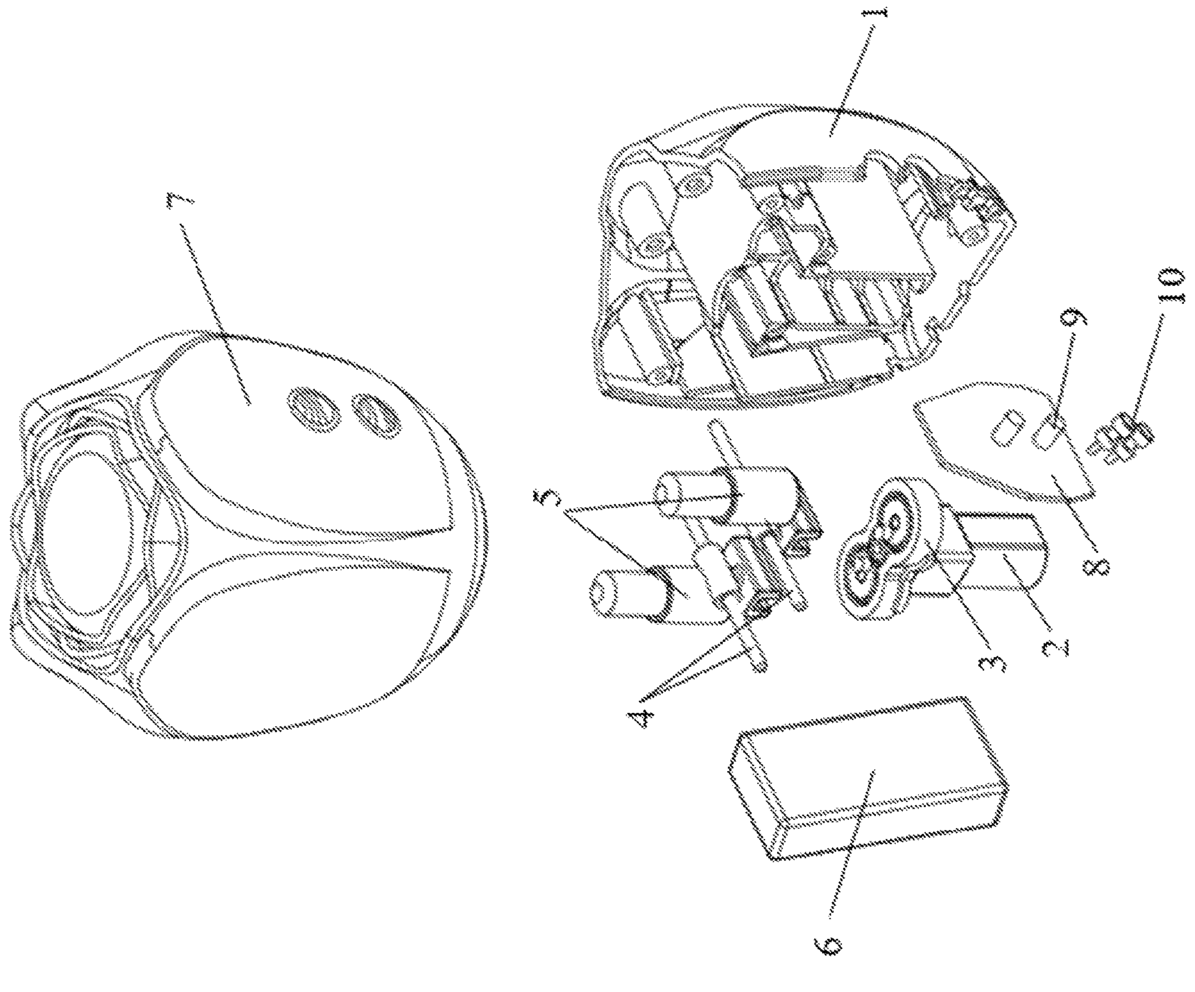
FIG. 1 is the splitting structural view of the internal structure within the shell of the massage device.
Figure 2:
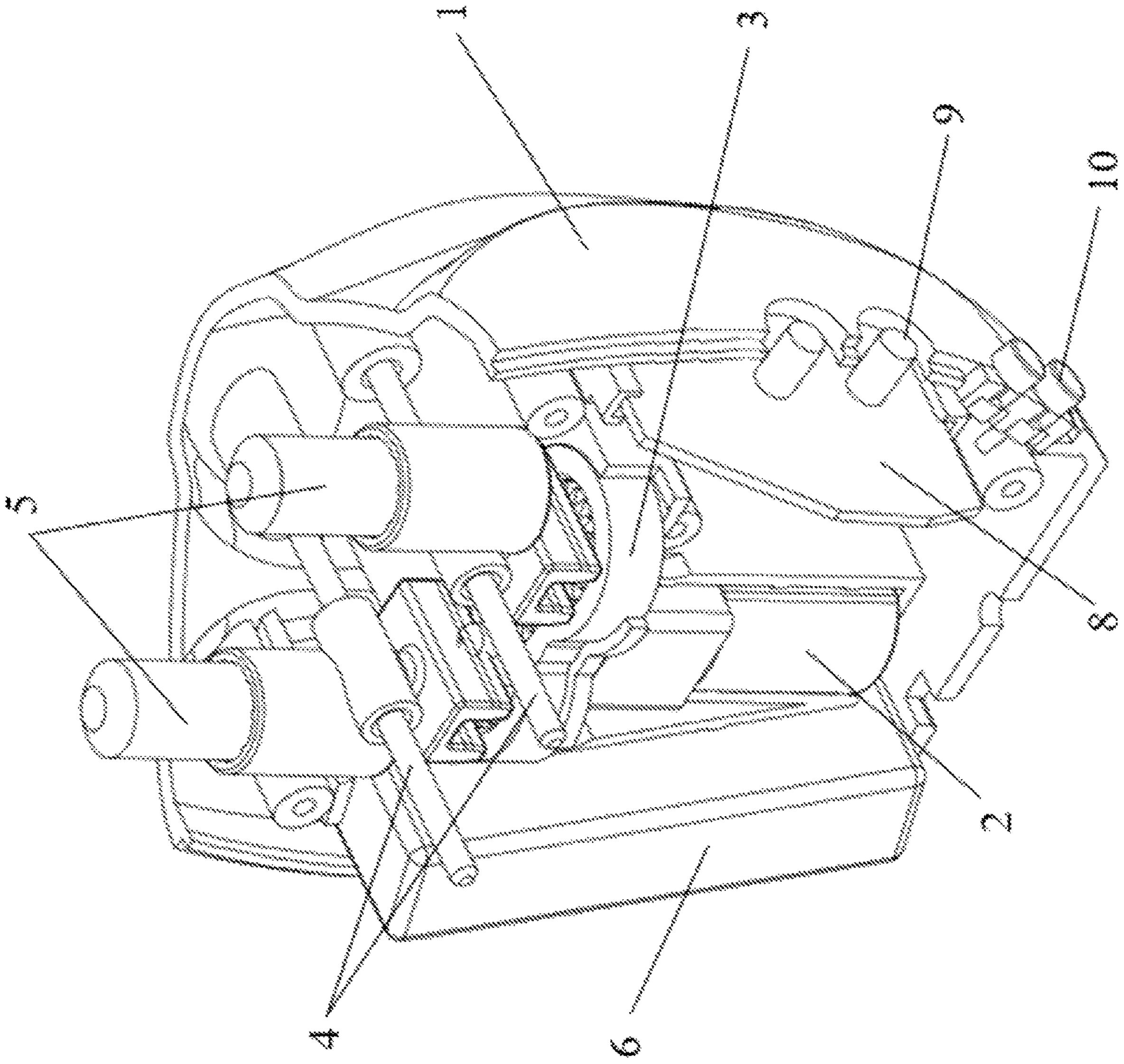
FIG. 2 is the perspective view of the internal structure within the shell of the massage device.

The technical solutions in the embodiments of the present invention will be clearly and completely described below. Obviously, the described embodiments are only part of the embodiments of the present invention, but not all of them. Based on the embodiment of the present invention, all other embodiments obtained by ordinary technicians in the field without creative labor are within the scope of the present invention.

Referring to FIGS. 1 to 4, the present invention provides a massage device, which comprises the shell 1 and two symmetrical elastic massage parts (not shown in the figure). The driving part and the guiding transmission part are provided within the shell 1, the driving part is connected with the guiding transmission part, and the guiding transmission part could drives the two elastic massage parts to move towards or away from each other.

The upper end of the shell 1 is open, and the guiding transmission part is connected with two elastic massage parts through the opening of the shell 1. The guiding transmission part comprises the guiding part 3, two fixed rods 4 and two swing parts 5.

The guiding part 3 comprises two vertically arranged rotating parts driven by the driving part. Two of rotating parts are provided with a column head 32 respectively, and the two column heads 32 are symmetrically arranged along the central axes of two rotating parts;

The two fixing rods 4 are positioned above the guiding part 3, symmetrically and in parallel with the rotation center of the guiding part 3, and both ends of the fixing rods 4 are fixed on the inner wall of the shell 1.

Two swing parts 5 are vertically arranged along the rotating parts and rotatably connected to two fixed rods 4 respectively; One end of each swing part 5 is provided with sliding groove 51, the column head 32 is arranged within the sliding groove 51 and can slide along the sliding groove 51; The other end of each swing part 5 is provided with jointed arm 52, which could extends out of the shell 1 through the upper opening of the shell 1 and could be connected with the elastic massage part. When the guiding part 3 rotates, the two swing parts 5 could swing around their respective fixed rods 4 in opposite directions or in reverse directions, in order to drive the elastic massage part to move oppositely or reversely, which could be said to be changed between closing or opening.

Figure 3:
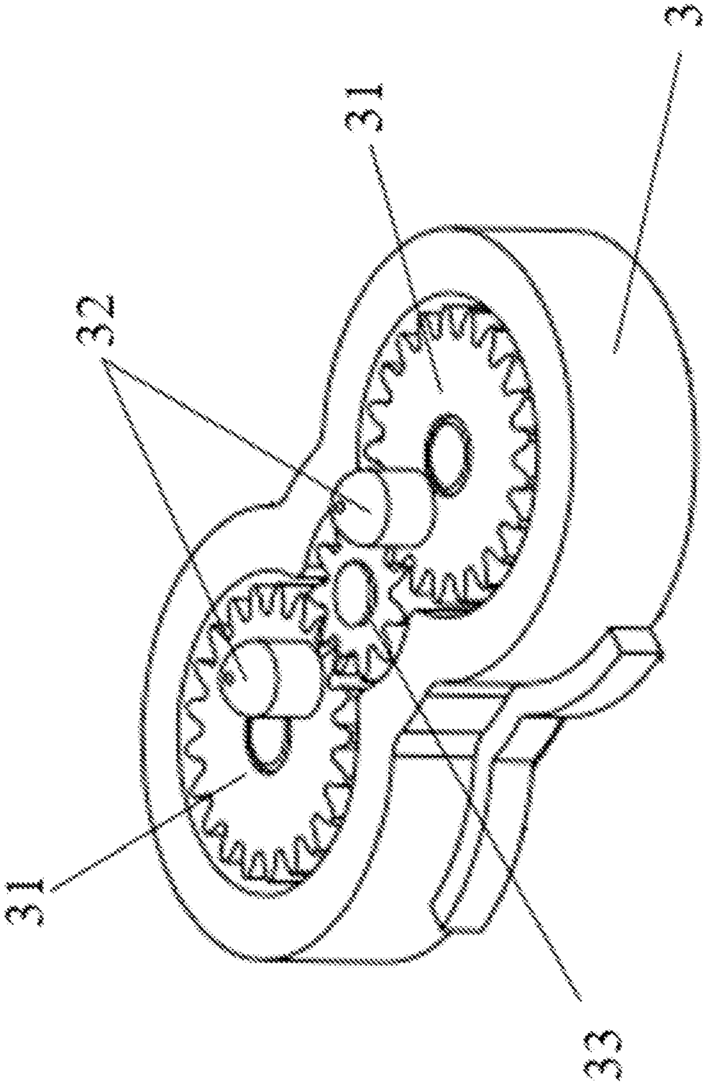
FIG. 3 is the perspective view of the guiding part of the massage device.

Referring to FIG. 3, the guiding part 3 further comprises the driving gear 33 directly driven by the driving part, and the rotating part, that is the driven gear 31. The driving gear 33 is meshed with two driven gears 31 respectively, in order to achieve the effect that the power and the transmission speed could be adjusted as required, the transmission ratio of the two gears could be adjusted according to the requirement of working speed, such as from high speed to low speed, from low speed to high speed, or the same specific speed of course.

When two driven gears 31 rotate in the same direction, then the column heads 32 arranged on them also move along with the rotation within the sliding grooves 51. The column head 32 is similar to the cylinder with contractile top, and the top could be hemispherical or conical, etc. The sliding groove 51 is in shape of inverted U-shaped, and the shape of the inner cross section is matched with the shape of the column head 32. The length of the sliding groove 51 could be adjusted to match the moving track of the column head 32 and the guiding part 3.

Specifically, when the relative distance between two column heads 32 is the longest, the distance between the end of two jointed arms 52 is the shortest, and when the relative distance between two column heads 32 is the shortest, the distance between the end of two jointed arms 52 is the farthest. It is noted that other designs could be adopted on the guiding part 3 of this invention, as long as it can drive the swing part to swing in the opposite or reverse direction.

Or the column head 32 and the sliding groove 51 could be interchanged, and some structural adjustments could be made on the guiding part 3 and the swing part 5 accordingly, so that the power of the guiding part 3 can be transmitted to the swing part 5, and the swing part 5 can swing in the opposite direction or in the reverse direction, finally, the elastic massage part moves oppositely or reversely to complete the massage work.

The fixing rod 4 could be sleeved on the shell 1 through an extended annular cavity provided on the inner wall of the shell 1. The two swing parts 5 could swing along the vertical direction of the fixing rods 4 respectively to realize the corresponding functions.

Integrated structure or a split structure could be adopted on the structure of swing part 5, sliding groove 51 and jointed arm 52 at both ends, which could be assembled together to complete the coordinated movement.

The location of swing part 5 is limited by the fixed rod 4, and rotates around the fixed rod 4 in the direction perpendicular to the guiding part 3. The swing part 5 could be sleeved on the fixed rod 4, or the middle part of the swing part 5 can be designed as C-shaped groove and clamped on the fixed rod 4.

Figure 4:
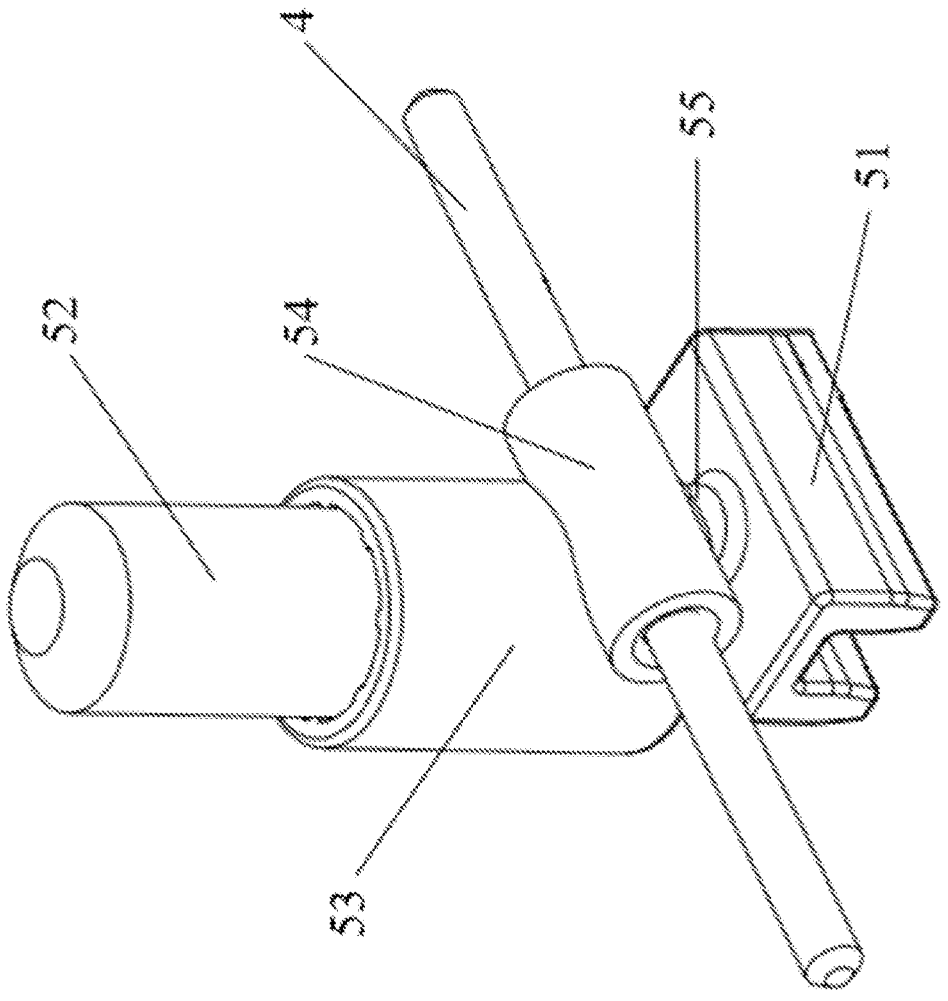
FIG. 4 is the perspective view of the swing part of the massage device.

Referring to FIG. 4, the swing part 5 comprises a horizontally arranged first connecting guiding sleeve 53, which is arranged at approximate middle part of the swing part 5 and is connected with the fixing rod 4 in a relatively rotating way; The connecting piece 54 is connected with the sliding groove 51, which extends downward from the first connecting guide sleeve 53; The second connecting guide sleeve 55 is connected with the jointed arm 52, which extends vertically upward from the first connecting guide sleeve 53.

The shape of the elastic massage parts driven by the jointed arms 52 could be varied to meet the function of the massager, such as two fingers, two sheets, or a shape suitable for matching with the body parts.

The two elastic massage parts could also be connected into a ring, for example, the ring or elliptical ring formed by two symmetrically half rings, and retractable fold could be arranged on that two half ring.

When the ring formed by two elastic massage parts, there is no need for the whole outer surface of the ring to be in contact with the surface of the user's body, as long as most of the surface energy could be contacted with the surface of the user's body, so as to massage and relax the muscle tissue of the human body.

The jointed arms 52 and the elastic massage parts could be fixedly connected or movably connected. For example, two elastic massage parts could be sleeved on the jointed arms 52.

In order to improve the use effect, the outer side of the shell 1 could be wrapped with a layer of elastic sleeve 7, and some humanized designs could be applied such as ergonomics, so that the user can grasp or hold the massager comfortably; or the elastic sleeve 7 and the elastic massage part could be designed as integrated structure. The elastic sleeve 7 and the elastic massage part can be made of elastic materials such as modified plastic, rubber, silica gel or EVA. Silica gel is preferred, which has good flexibility and elasticity, good skin-friendly performance, high mechanical strength, and is not easy to scuff and suitable for contact with human body parts.

The driving part of the massage device of the invention is the motor 2, one end of the motor shaft could be connected with the guiding part 3, in order to drive the guiding part 3 to rotate. The motor 2 can be powered by internal or external power supply, which could be rechargeable batteries, disposable batteries, or storage batteries. In order to maintain the stability of the device, the battery 7 can be arranged on the battery holder inside the shell 1.

The driving part also includes the control board 8 with control switch 9, which is connected with the battery 6 and the motor 2 respectively. The control board 8 can be fixed on the inner wall of the shell 1, and the control switch 9 is arranged to protrude out of the shell 1, which is convenient for the user to control.

On the side wall of the shell 1, the charging socket 10 matched with the rechargeable battery is provided, which can be connected with an external power supply to charge the rechargeable battery.

For the stability of each device, the motor 2 is placed on the motor fixing seat on the inner wall of the shell 1. When the speed of motor 2 is adjusted, the rotation speed of the guiding part 3 could be adjusted, so that the swing frequency of the jointed arms 52 could be adjusted, finally, different massage effects and personalized use requirements can be realized.

When the massage device of this invention is used, the elastic massage part could be placed on the surface of the user's body part, then turn on the control switch 9, power could be supplied by the battery 6, and the control board 8 controls and drives the motor 2 to work, the end of the motor shaft of the motor 2 drives the guiding part 3 to move, then the column head 32 arranged on the guiding part 3 drives the jointed arm 52 at the other end of the swing part 5 to reciprocate left and right in the direction perpendicular to the guiding part, the two jointed arms 52 drives the two elastic massage parts to move oppositely or reversely. The distance between the jointed arms 52 of the two swing parts 5 of the massage device and the swing amplitude could be adjusted according to the needs and be designed into different specifications. When the two elastic massage parts work in opposite or reverse movements (that is, open or close), users will not only feel the massage effect of grasping and pulling, but also experience the massage effect of sucking and rubbing, so that muscles tissues of different parts of users could be massaged and relaxed.

In order to obtain a better massage effect, the jointed arm 52 is equipped with the function of vibration. The vibration motor could be arranged inside the jointed arm 52, the vibration motor is electrically connected with the control panel 8 in the shell 1, and uniformly controlled by the control panel 8. The control button can be added to the control switch 9 correspondingly, which is convenient for users to use. When the vibration motor works and generates vibration, driving the jointed arm 52 and the elastic massage part to generate a sense of shock, which can further relax the muscle tissue of the user and achieve the functions of relaxing muscles and tendons, activating collaterals and physical therapy.

The massage device of the invention utilize the driving part to drive the guiding part, the column head on the guiding part is matched with the sliding groove at one end of the two swing parts, the other end of the two swing parts are provided with jointed arms which are respectively connected with the elastic massage parts, when the two column heads are driven by the guiding parts, the two jointed arms swing in opposite directions to drive massage part to be closed and opened; When the elastic massage part is placed on the muscle tissue of human body parts, the massage effect of grasping, pulling, sucking and rubbing of the muscles of human body parts could be realized. The massage device of this invention can massage body parts of the human body selectively, imitating the grasping and squeezing action of hands, so as to achieve the relaxing massage effect or physiotherapy exercise effect on the muscle groups of human organs. When people feel tired especially in busy work or daily life, it can also be used for acupoint massage, which can relieve fatigue, release stress, relax tendons and activate collaterals.

The preferred embodiments of the present invention disclosed above are provided only to help illustrate the present invention. The preferred embodiments do not exhaust all the details, nor do they limit the invention to the specific embodiments described. Obviously, many modifications and variations are possible in light of the contents of this specification. The present specification selects and specifically describes these embodiments in order to better explain the principles and practical applications of the present invention, so that those skilled in this field can well understand and utilize the present invention. The present invention is to be limited only by the claims and their full scope and equivalents.

What is claimed is:

1. A massage device comprising a shell (1) and two symmetrical elastic massage parts; a driving part and a guiding transmission part are provided within the shell (1); the driving part is connected with the guiding transmission part, and the guiding transmission part is configured to drive the two elastic massage parts to move towards or away from each other, wherein the guiding transmission part comprises the guiding part (3), two fixed rods (4) and two swing parts (5), wherein the guiding part (3) comprises two vertically arranged rotating parts driven by the driving part; Each of two rotating parts are provided with a column head (32) respectively, and the two column heads (32) are symmetrically arranged along the central axes of two rotating parts; wherein the two fixing rods (4) are positioned above the guiding part (3), symmetrically and in parallel with the rotation center of the guiding part (3), and both ends of the fixing rods (4) are fixed on the inner wall of the shell (1); and wherein the two swing parts (5) are vertically arranged along the rotating part and rotatably connected to two fixed rods (4) respectively; One end of two swing parts (5) are provided with sliding groove (51) respectively, the column head (32) is arranged within the sliding groove (51) and is configured to slide along the sliding groove (51); the other end of two swing parts (5) are provided with jointed arms (52), which is configured to be connected with the elastic massage parts respectively; when the guiding parts (3) rotate, the two swing parts (5) is configured to swing around the fixing rods (4) in opposite directions or in reverse directions respectively, in order to drive the elastic massage parts to move oppositely or reversely.

2. A massage device according to claim 1, wherein the guiding part (3) further comprises the driving gear (33) directly driven by the driving part, and the rotating part of driven gears (31), The driving gear (33) is meshed with two driven gears (31) respectively.

3. A massage device according to claim 2, wherein the two swing parts (5) is configured to swing in the vertical direction of the fixing rods (4) respectively.

4. A massage device according to claim 1, wherein the column head (32) is similar to the cylinder with contractile top, and the shape of the inner cross section of the sliding groove (51) is matched with the shape of the column head (32).

5. A massage device according to claim 1, wherein the swing part (5) comprises a horizontally arranged first connecting guiding sleeve (53), which is arranged at the approximately middle part of the swing part (5) and connected with the fixing rod (4) in a relatively rotating way; a connecting piece (54) is connected with the sliding groove (51), which extends downward from the first connecting guide sleeve (53); and a second connecting guide sleeve (55) is connected with the jointed arm (52), which extends vertically upward from the first connecting guide sleeve (53).

6. A massage device according to claim 1, wherein the elastic massage part has two fingers, or two sheets, or the shape suitable for matching with body parts.

7. A massage device according to claim 1, wherein the jointed arm (52) is equipped with the function of vibration.

8. A massage device according to claim 1, wherein the driving part is a motor.

9. A massage device according to claim 1, wherein the upper end of the shell (1) is open, and the guiding transmission part is connected with the two elastic massage parts through the opening of the shell (1).

* * * * *